(12) United States Patent
Kahn et al.

(10) Patent No.: US 11,059,234 B2
(45) Date of Patent: Jul. 13, 2021

(54) COMPOSITIONS FOR CAPSTOCK APPLICATIONS

(71) Applicant: TEKNOR APEX COMPANY, Pawtucket, RI (US)

(72) Inventors: Ali Kahn, North Attleboro, MA (US); Maryellen Cox, Cranston, RI (US); Roland Ruprecht, Attleboro, MA (US)

(73) Assignee: TEKNOR APEX COMPANY, Pawtucket, RI (US)

( * ) Notice: Subject to any disclaimer, the term of this patent is extended or adjusted under 35 U.S.C. 154(b) by 43 days.

(21) Appl. No.: 16/171,991

(22) Filed: Oct. 26, 2018

(65) Prior Publication Data

US 2019/0061274 A1   Feb. 28, 2019

Related U.S. Application Data

(63) Continuation of application No. 14/501,427, filed on Sep. 30, 2014, now abandoned.
(Continued)

(51) Int. Cl.
*B29C 65/48* (2006.01)
*B32B 27/08* (2006.01)
(Continued)

(52) U.S. Cl.
CPC .............. *B29C 65/48* (2013.01); *B32B 3/04* (2013.01); *B32B 5/02* (2013.01); *B32B 9/005* (2013.01); *B32B 9/045* (2013.01); *B32B 15/08* (2013.01); *B32B 21/08* (2013.01); *B32B 27/08* (2013.01); *B32B 27/12* (2013.01); *B32B 27/18* (2013.01); *B32B 27/20* (2013.01); *B32B 27/302* (2013.01);
(Continued)

(58) Field of Classification Search
CPC .......... C08L 27/06; C08L 25/12; C08L 33/20; C08L 51/003; C08L 51/04; C08L 75/08
See application file for complete search history.

(56) References Cited

U.S. PATENT DOCUMENTS 4,391,948 A * 7/1983 Falk .................. C08L 27/06
                                                                525/243
5,318,737 A   6/1994 Trabert et al.
(Continued)

FOREIGN PATENT DOCUMENTS

EP    0101900 A2    3/1984
EP    0298282 A2    1/1989
(Continued)

OTHER PUBLICATIONS

Chemtura, Blendex BMAT Technical Information, Chemtura Corporation, 2007, p. 1 (Year: 2007).*
(Continued)

*Primary Examiner* — Ramsey Zacharia
(74) *Attorney, Agent, or Firm* — Hudak, Shunk & Farine Co. LPA

(57) ABSTRACT

A thermoplastic polymer alloy compositions including a blend of polymers that each contribute beneficial properties to the compositions. The compositions exhibit characteristics desirable for outdoor applications such as weatherability, impact resistance and durability, while offering excellent surface appearance. The compositions are particularly suitable for decking applications and as capstock materials.

13 Claims, 1 Drawing Sheet

Related U.S. Application Data

(60) Provisional application No. 62/049,472, filed on Sep. 12, 2014.

(51) Int. Cl.

| | | |
|---|---|---|
| *B32B 27/40* | (2006.01) | |
| *B32B 27/30* | (2006.01) | |
| *B32B 5/02* | (2006.01) | |
| *B32B 9/00* | (2006.01) | |
| *B32B 15/08* | (2006.01) | |
| *B32B 21/08* | (2006.01) | |
| *B32B 27/12* | (2006.01) | |
| *B32B 27/18* | (2006.01) | |
| *B32B 27/20* | (2006.01) | |
| *B32B 3/04* | (2006.01) | |
| *B32B 27/06* | (2006.01) | |
| *B32B 15/095* | (2006.01) | |
| *B32B 15/082* | (2006.01) | |
| *C08L 27/24* | (2006.01) | |
| *C08L 27/06* | (2006.01) | |
| *C08L 27/08* | (2006.01) | |
| *B29C 48/21* | (2019.01) | |
| *B29C 48/07* | (2019.01) | |
| *B32B 9/04* | (2006.01) | |
| *B29K 75/00* | (2006.01) | |
| *B29K 33/18* | (2006.01) | |
| *B29K 27/06* | (2006.01) | |
| *B29L 9/00* | (2006.01) | |

(52) U.S. Cl.
CPC .......... *B32B 27/304* (2013.01); *B32B 27/308* (2013.01); *B32B 27/40* (2013.01); *C08L 27/06* (2013.01); *C08L 27/08* (2013.01); *C08L 27/24* (2013.01); *B29C 48/07* (2019.02); *B29C 48/21* (2019.02); *B29K 2027/06* (2013.01); *B29K 2033/18* (2013.01); *B29K 2075/00* (2013.01); *B29K 2995/0087* (2013.01); *B29K 2995/0089* (2013.01); *B29L 2009/00* (2013.01); *B32B 15/082* (2013.01); *B32B 15/095* (2013.01); *B32B 27/06* (2013.01); *B32B 2250/02* (2013.01); *B32B 2262/062* (2013.01); *B32B 2270/00* (2013.01); *B32B 2307/3065* (2013.01); *B32B 2307/558* (2013.01); *B32B 2307/584* (2013.01); *B32B 2307/712* (2013.01); *B32B 2419/00* (2013.01); *C08L 2205/03* (2013.01); *C08L 2205/035* (2013.01)

(56) References Cited

U.S. PATENT DOCUMENTS

| | | | |
|---|---|---|---|
| 5,457,146 A * | 10/1995 | Ogoe | ................ C08L 23/286 524/409 |
| 6,165,399 A | 12/2000 | Guntherberg et al. | |
| 6,410,638 B1 | 6/2002 | Kaufhold et al. | |
| 6,448,332 B1 | 9/2002 | Hughes | |
| 6,451,882 B1 | 9/2002 | Hughes | |
| 6,534,592 B1 | 3/2003 | Chou et al. | |
| 6,555,245 B2 | 4/2003 | Tajima et al. | |
| 6,696,513 B1 | 2/2004 | Welton et al. | |
| 6,773,821 B2 | 8/2004 | Tajima et al. | |
| 6,890,965 B1 | 5/2005 | Johnson et al. | |
| 7,338,706 B2 | 3/2008 | Nishimura et al. | |
| 7,378,462 B1 | 3/2008 | Hughes et al. | |
| 7,410,687 B2 | 8/2008 | Dolinar | |
| 7,651,648 B2 | 1/2010 | Eustace et al. | |
| 8,034,441 B2 | 10/2011 | Lefebvre et al. | |
| 8,097,677 B2 | 1/2012 | Breulmann et al. | |
| 8,455,099 B2 | 6/2013 | Chevalier et al. | |
| 8,658,716 B2 | 2/2014 | Lacock et al. | |
| 2003/0087084 A1 | 5/2003 | Mori et al. | |
| 2004/0167277 A1 | 8/2004 | Chang et al. | |
| 2007/0092701 A1 | 4/2007 | Jeng | |
| 2007/0154689 A1 * | 7/2007 | Hughes | .................. B32B 21/02 428/195.1 |
| 2008/0293837 A1 | 11/2008 | Toft et al. | |
| 2009/0258208 A1 | 10/2009 | Martin et al. | |
| 2010/0330272 A1 | 12/2010 | Jeng | |
| 2012/0128967 A1 | 5/2012 | Belcher, Jr. et al. | |
| 2013/0303644 A1 | 11/2013 | Majewski et al. | |
| 2013/0317139 A1 | 11/2013 | Majewski et al. | |
| 2014/0030538 A1 | 1/2014 | Boutillier et al. | |
| 2014/0071530 A1 * | 3/2014 | Park | ................. G02B 5/3083 359/489.03 |
| 2014/0147644 A1 | 5/2014 | Crabb et al. | |

FOREIGN PATENT DOCUMENTS

| | | |
|---|---|---|
| WO | 2000034383 A1 | 6/2000 |
| WO | 2014018699 A1 | 1/2014 |
| WO | 2014018817 A1 | 1/2014 |
| WO | 2014062371 A1 | 4/2014 |

OTHER PUBLICATIONS

Degroot, P. "Synthetic Decking Roundup", Professional Deck Builder, Article [online], Jan. 2012 [retrived on Oct. 31, 2015]. Retrieved from the internet: <URL: http://www.deckmagazine.com/ImagesSynthetic%20Decking%20Roundup_tcm122-1386326.pdf>.

Chemtura, Blendex BMAT Technical Information, Chemtura Corporation, 2007, p. 1.

Needfill, Ultra-High MW process aids, 2005, pp. 1-2, http:/needfill.co.kr/mo_8.htm.

* cited by examiner

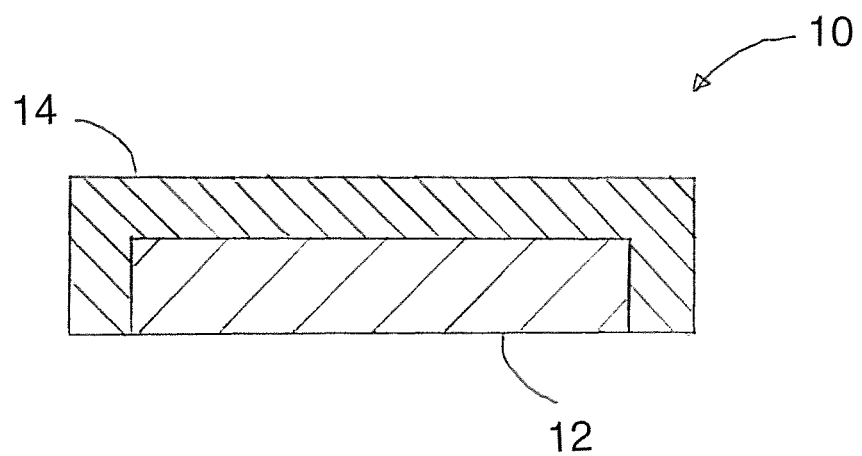

COMPOSITIONS FOR CAPSTOCK APPLICATIONS

FIELD OF THE INVENTION

The present invention relates to a thermoplastic polymer alloy compositions including a blend of polymers that each contribute beneficial properties to the compositions. The compositions exhibit characteristics desirable for outdoor applications such as weatherability, impact resistance and durability, while offering excellent surface appearance. The compositions are particularly suitable for decking applications and as capstock materials.

BACKGROUND OF THE INVENTION

Many different materials, for example, polymers such as polyvinyl chloride (PVC), acrylonitrile/butadiene/styrene (ABS) and high impact polystyrene (HIPS) exhibit desirable structural or mechanical properties when formed into an article of manufacture. However, sometimes the surface properties of such materials are lacking in one or more areas, for example scratch resistance, impact resistance and weatherability. As a result, multi-layer compositions have been developed wherein an outer layer or capstock has been bonded to a base material and covers a previously exposed surface in order to provide sought-after performance. Such capstock layers are usually thinner than the base material.

Various polymers and polymer blends have been used as capstocks, see for example U.S. Pat. Nos. 8,658,716, 8,034,441, 7,651,648, 7,338,706, 6,773,821, 6,696,513, 6,555,245, 6,534,592, 5,318,737; U.S. Publication Nos. 2013/0303644, 2013/0317139, 2012/0128967, 2010/0330272, 2009/0258208, 2008/0293837, 2007/0154689 2007/0092701; and International Application Nos. WO2014/018817.

Some documents, such as U.S. 2009/0258208, U.S. Pat. Nos. 6,555,245, and 6,773,821 describe a problem when using PVC as a capstock layer. As stated in these documents, PVC sometimes cannot withstand demanding environmental and outdoor UV exposure. In view of this, problems of present invention were to provide compositions, especially capstock compositions, that are easily processible, readily bondable to a substrate, weatherable, durable, impact resistant, mar and scratch resistant, and flame retardant.

SUMMARY OF THE INVENTION

The problems noted above and others are solved by the compositions of the present invention which comprise a blend of halogen-containing polymers such as polyvinyl chloride, thermoplastic polyurethane and one or more acrylic polymers.

One object of the invention is to provide a composition that can be applied as a capstock material over a layer of a substrate material, often as a relatively thin layer, via melt processing, thereby forming a composite.

Still another object of the present invention is to provide compositions that have excellent weatherability, impact resistance, durability, and/or desirable surface appearance.

Another object of the present invention is to provide capstock compositions, that are easily processable and readily bondable to a substrate.

An additional object of the present invention is to provide compositions, especially capstock compositions, that are mar and scratch resistant and/or flame retardant.

A further object of the present invention is to provide compositions that can be coextruded, crosshead extruded, or otherwise bonded to a substrate with good bond strength.

BRIEF DESCRIPTION OF THE DRAWINGS

The invention will be better understood and other features and advantages will become apparent by reading the detailed description of the invention, taken together with the drawings, wherein:

FIG. 1 is a cross-sectional view of one embodiment of a composite comprising a capstock material over a layer of a substrate material.

DETAILED DESCRIPTION OF THE INVENTION

The compositions of the present invention which are suitable, among other uses as capstock materials, comprise a blend of halogen-containing polymers, a thermoplastic polyurethane, and one or more, and preferably a plurality of different acrylic polymers. The compositions can also include other ingredients or additives, for example as described herein below. As utilized herein the term polymer encompasses both hompolymers and copolymers of two or more different monomers.

Halogen Containing Polymers

The polymer compositions of the invention incorporate a halogen-containing polymer therein. Examples of suitable halogen containing polymers include, but are not limited to, polyvinyl chloride, polyvinyl fluoride, polyvinyl bromide, polyvinylidene chloride, chlorinated polyvinyl chloride, polyvinylidene fluoride and polyvinylidene bromide. Chlorine containing vinyl polymers are preferred in one embodiment. Polyvinyl chloride is preferred in various embodiments.

Halogen-containing polymers, offer the benefit of being inherently flame retardant due to polymer containing relatively high halogen content, such as 57 weight % chlorine in the case of PVC. Various halogen-containing polymers, such as PVC are also polar in nature with the ionic bonds providing good chemical resistance against certain solvents.

Halogen-containing polymers are available from many commercial sources under various designations including, but not limited to, Oxyvinyl, as OXY 200, OXY 216S, OXY 500F, and as Oxy 225, Shintech as SE 800A, SE 950A, SE 1100A, Formosa, Formolon 616K, Formolon 622R, and Formolon 622F.

The halogen containing polymers can be present in compositions of the invention in amounts which range generally from about 15 to about 60, desirably from about 20 to about 40 and preferably from about 25 to about 35 parts by weight based on 100 total parts by weight of the composition.

Thermoplastic Polyurethane (TPU)

Thermoplastic polyurethanes are another polymer present in the blend compositions of the present invention. Polyurethanes are generally prepared by combining and reacting a polyol, generally a polyol component of at least one hydroxyl terminated intermediate such as a hydroxyl terminated polyether, polyester, polycarbonate or polycaprolactone, with a polyisocyanate. Polyamines are sometimes included in the reaction. The reaction can additionally include chain extenders and catalysts. Polyisocyanates include two or more isocyanate groups per molecule. Likewise, polyols include two or more hydroxyl groups per molecule.

In various embodiments, generally any type of TPU can be utilized and blends thereof, such as but not limited to ether and ester TPU grades. The thermoplastic polyurethanes used in the invention may be aliphatic or aromatic, or combinations thereof. In one preferred embodiment, polyurethanes prepared utilizing polyether polyols are preferred. Polyether TPU grades have the advantage of providing improved hydrolysis resistance, mildew resistance, and antimicrobial properties over polyester TPU resin grades.

Thermoplastic Polyurethanes provide the benefit of achieving exceptional abrasion resistance and chemical resistance. Thermoplastic polyurethanes also are known to reduce the modulus of PVC without incorporating plasticizers.

Polyurethanes are available from many commercial sources including, but not limited to, A. Shulman, Bayer, BASF, Huntsman, Lubrizol, RTP, and Techmer and COIM under various designations. Suitable TPU grades are from BASF as Elastollan A1154D, Elastollan 1195A, and Elastollan 1190A, Bayer as Texin DP7-3041, Texin DP7-3018, Texin DP7-3006, Texin DP7-3007, Texin DP7-SUN 3006, and from Lubrizol as Estane 58213.

The polyurethanes can be present in compositions of the invention in amounts which range generally from about 1 to about 50, desirably from about 1 to about 40 and preferably from about 1 to about 25 parts by weight based on 100 total parts by weight of the composition.

Acrylic Polymers

The compositions of the present invention include at least one and preferably a plurality of different acrylic polymers. Various different acrylic polymers can be utilized including, but not limited to, polyacrylate-styrene-acrylonitrile, styrene-acrylonitrile, cross-linked acrylonitrile and high molecular weight or ultra-high-molecular weight styrene-acrylonitrile copolymer.

Polyacrylate-Styrene-Acrylonitrile (ASA) Copolymer

The compositions of the present invention also include a polyacrylate-styrene-acrylonitrile copolymer. ASA is typically classified as a terpolymer which can be made by various methods as known to those of ordinary skill in the art. For example, ASA can be made by grafting SAN to an acrylate, for example a polybutylacrylate rubber, to form a SAN-soluble polybutylacrylate rubber.

Other acrylates can be utilized, such as alkyl (meth) acrylates having generally from about 1 to about 8 carbon atoms, such as methyl (meth)acrylate, ethyl (meth)acrylate, propyl (meth)acrylate, or ethylhexyl (meth)acrylate. When utilized herein, the term "(meth)" means that methyl group may be present or absent. Butyl (meth)acrylate is preferred in one embodiment.

Styrene in the ASA refers to any vinyl aromatic monomer, including, but not limited to styrene; alkyl styrene, such as alpha-methylstyrene; and ring-alkylated styrenes, for example p-methylstyrene.

Acrylonitrile monomers include acrylonitrile and methacrylonitrile.

The acrylate content of the ASA ranges generally from about 10 to about 60, desirably from about 30 to about 50 and preferably from about 35 to about 45 parts per 100 parts by weight of the ASA. Further, the ASA typically has a styrene content of from generally about 20 to about 50, desirably from about 25 to about 40 and preferably from about 25 to about 30 parts per 100 parts by weight of the ASA. The ASA has an acrylonitrile content of from generally about 5 to about 35, desirably from about 5 to about 30 and preferably from about 10 to about 20 parts per 100 parts by weight of the ASA.

Various grades of ASA are commercially available from sources such as BASF as LURAN™ SSE, Sabic as Geloy™ CR3020, and Galata Chemicals as Royaltuf® 960A which is stated to include 60 percent polybutylacrylate and Royaltuf® 945A which is stated to include 45 percent polybutylacrylate.

ASA provide the benefit of offering exceptional weathering and UV resistance particularly of dark colored articles.

The ASA can be present in compositions of the invention in amounts which range generally from about 10 to about 50, desirably from about 15 to about 50 and preferably from about 15 to about 35 parts by weight based on 100 total parts by weight of the composition.

Styrene Acrylonitrile (SAN) Copolymer

At least one styrene acrylonitrile copolymer is also present in the compositions of the present invention. In some embodiments, two or more, three or more, etc., different types of SAN are present. SAN is typically classified as a copolymer, which is made by reacting acrylonitrile monomers and styrene monomers, see for example the acrylonitrile and styrene monomers defined hereinabove.

In one embodiment of the present invention, a so-called standard type of SAN is utilized. SAN provides the benefit of a fusion promoter and process aid for PVC. SAN also provides the ability for dilution with ASA to control the rubber wt % content of the ASA. In a further embodiment of the present invention, the compositions include cross-linked SAN. The cross-linked SAN is useful as a matting agent in various embodiments of the invention. The cross-linked SAN is a matting agent and is a mixture of polystyrene and acrylonitrile-styrene copolymer, including a styrene-based matrix and cross-linked acrylonitrile-styrene copolymer wherein the mixture can include polystyrene in an amount of 20-30 weight % and acrylonitrile-styrene copolymer in an amount of about 70-80 weight %. In yet a further embodiment of the present invention, a relatively high molecular weight styrene-acrylonitrile copolymer is utilized in compositions of the present invention. By high molecular weight it is meant that the end copolymer has a molecular weight greater than 1 million, desirably greater than 2 million, preferably greater than 3 million weight average as measured by Gel Permeation Chromatography (GPC) using a suitable solvent and compared against Polystyrene standards. By comparison, the standard grades of SAN include molecular weights below the lowest range of the high molecular weight SAN, i.e. 1 million weight average or less and preferably below 500,000 weight average. High-molecular weight SAN can adjust the melt strength during extrusion.

The SAN generally has an acrylonitrile content of preferably from about 10 to about 50 parts by weight based on 100 parts by weight of the SAN. That said, the SAN styrene content ranges preferably from about 50 to about 90 parts by weight based on 100 parts by weight of the SAN.

The SAN can be present in compositions of the invention in amounts which range generally from about 10 to about 50, desirably from about 10 to about 40 and preferably from about 10 to 30 parts by weight based on 100 total parts by weight of the composition. The cross-linked SAN can be present in compositions of the invention in amounts which range generally from 0.25 to about 4.0, desirably from about 0.50 to about 2.5, and preferably from about 0.75 to about 2.0 parts by weight based on 100 total parts by weight of the composition. High molecular weight SAN can be present in compositions of the invention in amounts which range generally from about 0.1 to about 20, desirably from about 0.1 to about 10 and preferably from about 0.1 to 8 parts by weight based on 100 total parts by weight of the composition.

Suitable grades of SAN are commercially available from sources such Styrolution as LURAN® 358N, LORAN®-VLN, and LURAN®-VLR and Galata Chemicals as Blendex® 869, Blendex® 5215, Blendex® 5233, and Blendex® BMAT.

In one preferred embodiment, the compositions of the present invention include two or more, three or more, four more different grades or types of SAN. In one preferred embodiment, the compositions include SAN, cross-linked SAN, and high molecular weight SAN.

Optional Additives

The compositions of the present invention can also include additives, each in a sufficient amount to obtain alone or in combination with other components, a desired property of the composition. Such additives are well known to those of ordinary skill in the art and are described in various references regarding polymeric materials, e.g. Modern Plastics Handbook and Additives for Plastic Handbook. Examples of various additives that can be included in compositions of the present invention include, but are not limited to, colorants, pigments, plasticizers, lubricants, UV stabilizers, light stabilizers, thermal stabilizers, antioxidants, antistatic agents, flame retardants, fillers, fibers, processing aids, biocides, surfactants, blowing agents, foaming agents, waxes and combinations thereof.

The additives can be utilized in various amounts to impart a desired property to the composition. Thus, ranges of individual additives within a composition can vary.

Composition Form and Processing

The compositions of the present invention are generally prepared by compounding or blending the desired components in one or more steps, preferably by mixing. The composition is preferably heated to obtain a melted composition, preferably with mixing, to substantially disperse the components thereof, as desired. The blending is preferably performed at a temperature below the decomposition temperatures of the components and generally from about 140° C. to about 200° C. The compositions can be prepared for example in a Banbury, on a two roll mill, in a continuous mixer such as single screw or twin screw extruder, a kneader, or any other mixing machine as known to those of ordinary skill in the art. After preparation of the compositions, they can be processed into any desired form. For example, the compositions can be of a form, such as, but not limited to, a powder, pellet, strand, bead, etc., of various shapes and sizes. Alternatively, the compositions can be directly molded, or shaped as desired, for example using an extruder, injection molder, compression molder, calender, or the like.

Composition Features for capstock material are high abrasion resistance, excellent outdoor UV protection, high SOI, and good chemical stain resistance.

Uses/Composites

In some embodiments, the compositions of the present invention can be formed into a useful article, such as any of the articles mentioned herein.

Various composites can also be formed including at least one layer of a composition of the present invention and at least a second layer. The composite can be manufactured as articles including, but not limited to, decking, siding, fencing, frames, gutters, appliance housings, appliance liners, building materials, countertops, bathtubs, shower surround materials, railings, shutters, and extruded profiles.

As illustrated in FIG. 1, one suitable use for the compositions of the present invention is as a capstock. FIG. 1 illustrates an article 10 in the form of an article that can be used for wood-replacement applications, for example decking, fencing, railing, siding, and the like. Article 10 includes a substrate or core 12 and a capstock layer 14. The core 12 can comprise any desired material, such as, but not limited to, a polymeric material, cellulosic material, metallic material, ceramic material or any combination thereof.

The substrate or core to which a composition of the present invention can be attached to form a composite is formed from any suitable material. Various thermoplastic resins are especially useful for making building products, but would benefit from a protective or capstock layer of the present invention, with examples including a halogen-containing polymers such as PVC and chlorinated PVC; acrylonitrile-butadiene-styrene (ABS), polyolefins such as polyethylene and polypropylene; polystyrene such as high impact polystyrene; polycarbonate, nylon; polyester; and combinations thereof. In various embodiments the substrate may be foamed, for example foamed PVC, foamed ABS, and other polymeric material.

Cellulosic materials include any plant matter, for example wood and various plant fibers, such as flax fiber.

The capstock layer 14 comprises a composition of the present invention. The core 12 can have dimensions that vary according to the end use. Typical dimensions are those such as of wood boards utilized for decking, fencing, siding, railing or the like. The capstock layer 14 is a relatively thin coating layer than may have a thickness generally between about 0.38 to about 1.27 mm, desirably from about 0.51 to about 1.14 mm and preferably from about 0.64 to about 1.02 mm. The capstock layer is present on at least one surface of the article 10. As illustrated in FIG. 1, the capstock layer 14 covers three sides of the core 12 in one embodiment. If desired, all four sides could be coated with a capstock layer. Likewise, the core in some embodiments may have more than six sides that are coated in some embodiments.

The composition of the present invention can be bonded to a substrate or core layer to form a composite by various methods. For example, a capstock layer can be bonded to the substrate with an adhesive. In other embodiments the capstock layer and substrate layer are laminated or co-extruded to bond the capstock and substrate layers together. It is to be understood that the present invention is not limited to any particular method of making the composite article or product.

In a preferred embodiment, a composition of the present and a substrate layer adhere to each other and are materials which are compatible and/or miscible with one another. If desired, various surface treatments can be utilized to promote adhesion. Alternatively or in concert therewith, an adhesive can be utilized to adhere various layers of materials utilized to form a composite including or having a layer comprising a composition of the present invention.

For the avoidance of doubt, the compositions of the present invention encompass all possible combinations of the components, including various ranges of said components, disclosed herein. It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

Examples

The examples set forth below are provided to illustrate the compositions of the present invention. These examples are not intended to limit the scope of the invention.

All of the materials before melt mixing were pre-mixed to a substantially free flowing state and were melt mixed with a Farrel Corp banbury batch mixer. The fluxed batch was dropped and probed with an internal batch temperature between 166° C.-188° C. The fluxed batch was then placed through a two roll which was annealed and prepared into a mill sheet. The mill sheet was cut into strips and run through a dicer. The diced pellets were then run through a two roll mill where another mill sheet was prepared. A portion of this mill sheet was then used for the chemical stain testing. The remainder of the mill sheets were then used to compression mold test plaques using a steam heated press for hardness, oxygen index, and abrasion testing.

The following raw materials were utilized for the examples.

| | |
|---|---|
| PVC | Oxy 216S from OXY VINYLS LP |
| TPU | Texin DP7-3041 from Bayer Material Science LLC |
| ASA | Royaltuf 960A from Galata Chemicals LLC |
| SAN #1 | Blendex 5215 from Galata Chemicals LLC |
| SAN #2 | Blendex BMAT from Galata Chemicals LLC |
| SAN #3 | Blendex 869 from Galata Chemicals LLC |
| Antimony Oxide | BRIGHTSUN HB from Albermarle Corporation |
| Calcium Stearate | COAD 10 from HM ROYAL INC |
| PE Wax | Polyethylene AC 629A from Honeywell INC NJ |
| EBS Wax | Advawax 280 from PMC Biogenix, INC |
| Stearyl Stearate Ester | Struktol VSSE from Struktol Co. |
| AO/UV | Package from Teknor Apex Co. |
| Stabilizer | REATINOR RT4472 from Reagens USA INC |
| Pigment | CI Yellow 164 from The Shepherd Color Company |

Following test protocols were used for testing:

| | | |
|---|---|---|
| Hardness | Shore D | ASTM D-2240 |
| Oxygen Index | % | ASTM D-2863 |
| Taber Abrasion - H18 | Weight loss (g) | ASTM D-1044 |
| Chemical Staining | SPF Spray<br>Gasoline<br>Goof Off<br>Denatured Alcohol | Subject specimen to each chemical for 15 minutes and subjectively rate as chemical staining (whitening) occurs |

TABLE 1

Comparative Examples Based on Individual Polymer Components

| Example | | Comparative Example 1 | Comparative Example 2 | Comparative Example 3 |
|---|---|---|---|---|
| PVC | | 97.51 | | |
| TPU | | | 97.51 | |
| ASA | | | | 56.19 |
| SAN#1 | | | | 41.32 |
| SAN#2 | | 1.50 | 1.50 | 1.50 |
| SAN#3 | | 4.00 | 4.00 | 4.00 |
| Antimyony Oxide | | 3.00 | 3.00 | 3.00 |
| Calcium Stearate | | 0.30 | 0.30 | 0.30 |
| PE Wax | | 0.05 | 0.05 | 0.05 |
| EBS Wax | | 0.40 | 0.40 | 0.40 |
| Stearyl Stearate Ester | | 0.30 | 0.30 | 0.30 |
| AO/UV | | 0.85 | 0.85 | 0.85 |
| Stabilizer | | 0.60 | 0.60 | 0.60 |
| Pigment | | 6.00 | 6.00 | 6.00 |
| Total Parts (weight) | | 114.51 | 114.51 | 114.51 |
| Hardness Hand (10 second delay) | D | 83 | 50 | 68 |
| Oxygen Index | % | 47.0% | 19.5% | 20.0% |
| Taber Abrasion - H18 after 1,000 hours | Grams lost | 0.13 | 0.11 | 0.24 |
| Chemical Staining after SPF Spray | | None | Moderate | Slight |
| Chemical Staining after Gasoline | | None | V. Slight | Slight |
| Chemical Staining after Goof Off | | Slight | Moderate | Severe |
| Chemical Staining after Denatured Alcohol | | None | Slight | None |

Table 1 presents three comparative examples utilizing a single polymer. Comparative example 1 utilizes PVC which exhibits a high limiting oxygen index and very good chemical stain resistance, but a high hardness and known poor outdoor UV weather and environmental resistance exists. Comparative example 2 utilizes TPU which has a reduced hardness and improved taber abrasion resistance over PVC but exhibits very poor chemical resistance. Comparative example 3 utilizes ASA which is known to provide superior outdoor UV weather and environmental resistance exhibits moderate chemical resistance but has a poor limiting oxygen index and poor abrasion resistance.

TABLE 2

Comparative Examples Based on Polymer Blends and Inventive Example

| Example | Comparative Example 4 | Comparative Example 5 | Comparative Example 6 | Inventive Example |
|---|---|---|---|---|
| PVC | 30.00 | 30.00 | | 30.00 |
| TPU | 67.51 | | 30.00 | 20.00 |
| ASA | | 38.91 | 38.91 | 27.38 |
| SAN#1 | | 28.60 | 28.60 | 20.13 |
| SAN#2 | 1.50 | 1.50 | 1.50 | 1.50 |
| SAN#3 | 4.00 | 4.00 | 4.00 | 4.00 |
| Antimyony Oxide | 3.00 | 3.00 | 3.00 | 3.00 |
| Calcium Stearate | 0.30 | 0.30 | 0.30 | 0.30 |
| PE Wax | 0.05 | 0.05 | 0.05 | 0.05 |
| EBS Wax | 0.40 | 0.40 | 0.40 | 0.40 |
| Stearyl Stearate Ester | 0.30 | 0.30 | 0.30 | 0.30 |

TABLE 2-continued

Comparative Examples Based on Polymer Blends and Inventive Example

| Example | | Comparative Example 4 | Comparative Example 5 | Comparative Example 6 | Inventive Example |
|---|---|---|---|---|---|
| AO/UV | | 0.85 | 0.85 | 0.85 | 0.85 |
| Stabilizer | | 0.60 | 0.60 | 0.60 | 0.60 |
| Pigment | | 6.00 | 6.00 | 6.00 | 6.00 |
| Total Parts (Weight) | | 114.51 | 114.51 | 114.51 | 114.51 |
| Hardness Hand (10 second delay) | D | 68 | 74 | 60 | 70 |
| Oxygen Index | % | 21.5% | 25.0% | 21.0% | 24.5% |
| Taber Abrasion | Grams lost | 0.13 | 0.15 | 0.36 | 0.21 |
| Chemical Staining after SPF Spray | | Moderate | None | Moderate | None |
| Chemical Staining after Gasoline | | None | Slight | Severe | V. Slight |
| Chemical Staining after Goof Off | | Slight | Severe | Severe | Slight |
| Chemical Staining after Denatured Alcohol | | V. Slight | None | Moderate | None |

Table 2 presents three comparative examples utilizing polymer blends with either PVC/TPU, PVC/ASA, or ASA/TPU. Comparative example 4 utilizes PVC/TPU which exhibits a relatively low hardness, very low abrasion resistance, but a low LOI and poor chemical stain resistance. Comparative example 5 utilizes a PVC/ASA blend which has a higher LOI and low abrasion resistance, but has a relatively high hardness and suffers severe staining after Goof Off chemical exposure. Comparative example 6 utilizes an ASA/TPU blend which provides improved hardness, but has poor chemical stain resistance, low LOI, and poor abrasion resistance. The inventive example utilizes a ternary blend comprising PVC/ASA/TPU which has an overall balance of properties that are desirable for capstock decking applications as well as other plastic parts. This inventive sample achieves desirable chemical stain resistance, higher LOI, good abrasion resistance, reduced hardness, and good outdoor UV resistance.

While in accordance with the patent statutes the best mode and preferred embodiment have been set forth, the scope of the invention is not limited thereto, but rather by the scope of the attached claims.

What is claimed is:

1. A thermoplastic composition for capstock, consisting of:
   a single halogenated polymer consisting of a polyvinyl chloride polymer in an amount from about 20 to about 40 parts by weight based on 100 total parts by weight of the composition;
   an aliphatic thermoplastic polyurethane polymer derived from at least a polyether polyol and a polyisocyanate, the thermoplastic polyurethane polymer present in an amount from about 1 to about 40 parts by weight based on 100 total parts by weight of the composition;
   a polyacrylate-styrene-acrylonitrile copolymer in an amount from about 15 to about 35 parts by weight of the composition, wherein acrylate content is from about 30 to about 60 parts by weight per 100 parts of the polyacrylate-styrene-acrylonitrile copolymer, wherein the styrene content is from about 25 to about 40 parts by weight per 100 parts of the polyacrylate-styrene-acrylonitrile copolymer, wherein the acrylonitrile content is from about 5 to about 30 parts by weight per 100 parts of the polyacrylate-styrene-acrylonitrile copolymer;
   a styrene acrylonitrile copolymer in an amount from about 10 to about 40 parts by weigh based on 100 total parts by weight of the composition, wherein the styrene acrylonitrile copolymer has an acrylonitrile content of about 10 to about 50 parts by weight and a styrene content of about 50 to about 90 parts by weight based on 100 parts by weight of the styrene acrylonitrile copolymer; and
   optionally, one or more of a colorant, pigment, lubricant, UV stabilizer, light stabilizer, thermal stabilizer, antioxidant, antistatic agent, flame retardant, filler, fiber, processing aid, biocide, surfactant, blowing agent, foaming agent, and wax; and
   optionally a mixture of a cross-linked acrylonitrile-styrene copolymer and polystyrene including the polystyrene in an amount of 20 to 30 weight percent and acrylonitrile-styrene copolymer in an amount of about 70 to 80 weight percent based on the total weight of the mixture, the mixture present in an amount from 0.5 to about 2.5 parts by weight based on 100 total parts of the composition; and
   optionally an additional styrene-acrylonitrile copolymer having a weight average molecular weight greater than 1 million as measured by gel permeation chromatography utilizing a suitable solvent in compared against polystyrene standards in an amount from 0.1 to about 10 parts by weight based on 100 total parts by weight of the composition.

2. The composition according to claim 1, wherein the polyacrylate-styrene-acrylonitrile copolymer is a graft copolymer of a styrene acrylonitrile copolymer grafted to a polyacrylate.

3. The composition according to claim 1, wherein the polyacrylate-styrene-acrylonitrile copolymer is a graft copolymer of a styrene acrylonitrile copolymer grafted to a polybutylacrylate.

4. The composition according to claim 3, wherein the styrene content is from about 25 to about 30 parts by weight per 100 parts of the polyacrylate-styrene-acrylonitrile copolymer, and wherein the acrylonitrile content is from about 10 to about 20 parts by weight per 100 parts of the polyacrylate-styrene-acrylonitrile copolymer.

5. The composition according to claim 2, wherein the polyvinyl chloride polymer is present in an amount from about 25 to about 35 parts by weight based on 100 total parts by weight of the composition, wherein the polyurethane is present in an amount from about 1 to about 25 parts by weight based on 100 total parts by weight of the composition.

6. The composition according to claim 5, wherein the styrene acrylonitrile copolymer is present in an amount from about 10 to 30 parts by weight based on 100 total parts by weight of the composition.

7. The composition according to claim 1, wherein the composition includes the mixture of a cross-linked acrylonitrile-styrene copolymer and polystyrene including the polystyrene in an amount of 20 to 30 weight percent and acrylonitrile-styrene copolymer in an amount of about 70 to 80 weight percent based on the total weight of the mixture, the mixture present in an amount from 0.5 to about 2.5 parts by weight based on 100 total parts of the composition.

8. The composition according to claim 7, wherein the composition includes the additional styrene-acrylonitrile copolymer having a weight average molecular weight greater than 1 million as measured by gel permeation chromatography utilizing a suitable solvent in compared against polystyrene standards in an amount from 0.1 to about 10 parts by weight based on 100 total parts by weight of the composition.

9. A thermoplastic composition for capstock, consisting of:
 a single halogenated polymer consisting of a polyvinyl chloride polymer in an amount from about 20 to about 60 parts by weight based on 100 total parts by weight of the composition;
 an aliphatic thermoplastic polyurethane polymer present in an amount from about 1 to about 40 parts by weight based on 100 total parts by weight of the composition;
 a polyacrylate-styrene-acrylonitrile copolymer in an amount from about 15 to about 35 parts by weight of the composition, wherein acrylate content is from about 30 to about 60 parts by weight per 100 parts of the polyacrylate-styrene-acrylonitrile copolymer, wherein the styrene content is from about 25 to about 40 parts by weight per 100 parts of the polyacrylate-styrene-acrylonitrile copolymer, wherein the acrylonitrile content is from about 5 to about 30 parts by weight per 100 parts of the polyacrylate-styrene-acrylonitrile copolymer, wherein the polyacrylate-styrene-acrylonitrile copolymer is a graft copolymer of a styrene acrylonitrile copolymer grafted to a polyacrylate;
 a first styrene acrylonitrile copolymer in an amount from about 10 to about 40 parts by weigh based on 100 total parts by weight of the composition, wherein the first styrene acrylonitrile copolymer has an acrylonitrile content of about 10 to about 50 parts by weight and a styrene content of about 50 to about 90 parts by weight based on 100 parts by weight of the styrene acrylonitrile copolymer; a mixture of a cross-linked acrylonitrile-styrene copolymer and polystyrene including the polystyrene in an amount of 20 to 30 weight percent and acrylonitrile-styrene copolymer in an amount of about 70 to 80 weight percent based on the total weight of the mixture, the mixture present in an amount from 0.5 to about 2.5 parts by weight based on 100 total parts of the composition;
 a second styrene-acrylonitrile copolymer having a weight average molecular weight greater than 1 million as measured by gel permeation chromatography utilizing a suitable solvent in compared against polystyrene standards in an amount from 0.1 to about 10 parts by weight based on 100 total parts by weight of the composition; and
 optionally, one or more of a colorant, pigment, lubricant, UV stabilizer, light stabilizer, thermal stabilizer, antioxidant, antistatic agent, flame retardant, filler, fiber, processing aid, biocide, surfactant, blowing agent, foaming agent, and wax.

10. The composition according to claim 9, wherein the polyacrylate-styrene-acrylonitrile copolymer is a graft copolymer of a styrene acrylonitrile copolymer grafted to a polybutylacrylate.

11. The composition according to claim 10, wherein the polyvinyl chloride polymer is present in an amount from about 25 to about 35 parts by weight based on 100 total parts by weight of the composition, wherein the polyurethane is present in an amount from about 1 to about 25 parts by weight based on 100 total parts by weight of the composition.

12. The composition according to claim 11, wherein the styrene content is from about 25 to about 30 parts by weight per 100 parts of the polyacrylate-styrene-acrylonitrile copolymer, and wherein the acrylonitrile content is from about 10 to about 20 parts by weight per 100 parts of the polyacrylate-styrene-acrylonitrile copolymer.

13. The composition according to claim 11, wherein the first styrene acrylonitrile copolymer is present in an amount from about 10 to 30 parts by weight based on 100 total parts by weight of the composition.

* * * * *